United States Patent [19]

Nadkarni et al.

[11] Patent Number: 4,478,787

[45] Date of Patent: Oct. 23, 1984

[54] METHOD OF MAKING DISPERSION STRENGTHENED METAL BODIES AND PRODUCT

[75] Inventors: Anil V. Nadkarni, Mentor; Prasanna K. Samal, Lyndhurst; James C. Wang, Mentor, all of Ohio; James E. Sunk, Philadelphia, Pa.

[73] Assignee: SCM Corporation, New York, N.Y.

[21] Appl. No.: 561,236

[22] Filed: Dec. 14, 1983

Related U.S. Application Data

[63] Continuation-in-part of Ser. No. 389,604, Jun. 18, 1982.

[51] Int. Cl.$^3$ .............................. B22F 5/00; B22F 7/04
[52] U.S. Cl. ............................................ 419/8; 419/48; 419/50; 419/51; 419/28; 428/558; 428/548; 75/232; 75/235; 219/146.22; 219/145.1
[58] Field of Search ...................... 419/48, 50, 51, 28, 419/8; 428/558, 548; 75/235, 232; 219/146, 22, 145.1

[56] References Cited

U.S. PATENT DOCUMENTS

| | | | |
|---|---|---|---|
| 3,149,509 | 9/1964 | Oquist et al. | 78/21 |
| 3,179,515 | 4/1965 | Grant et al. | 75/206 |
| 3,440,042 | 4/1969 | Kaufmann | 419/41 |
| 3,779,714 | 12/1973 | Nadkarni et al. | 29/182.5 |
| 3,884,676 | 5/1975 | Nadkarni et al. | 75/0.5 BC |
| 4,038,738 | 8/1977 | Fischmeister et al. | 29/420.5 |
| 4,045,644 | 8/1977 | Shafer et al. | 219/119 |
| 4,315,770 | 2/1982 | Nadkarni | 75/0.5 BC |

FOREIGN PATENT DOCUMENTS

| | | | |
|---|---|---|---|
| 654962 | 10/1946 | United Kingdom | 419/41 |
| 0981065 | 1/1965 | United Kingdom . | |

OTHER PUBLICATIONS

Goetzel, *Treatise on Powder Metallurgy*, pp. 661–663, (1949), Interscience Publishers.

*Primary Examiner*—Ben R. Padgett
*Assistant Examiner*—Anne Brookes
*Attorney, Agent, or Firm*—R. A. Sturges; M. H. Douthitt

[57] ABSTRACT

A process and a product produced thereby, for forming rod or bar or tube stock or strip, comprising a sheath and a densified dispersion strengthened metal core. Powdered dispersion strengthened copper is put into a metal can and compressively reduced to size and density. The relationship between the tensile strength of the core when fully densified and the cold worked tensile strength of the can is important to the nature of the product.

43 Claims, 2 Drawing Figures

METHOD OF MAKING DISPERSION STRENGTHENED METAL BODIES AND PRODUCT

This application is a continuation-in-part of our co-pending application Ser. No. 389,604 filed June 18, 1982 now pending.

The present invention relates to a method of making dispersion strengthened metal rods and tubes, and more particularly to a process for producing a sheathed dispersion strengthened copper rod or tube.

BACKGROUND OF THE INVENTION AND PRIOR ART

Dispersion strengthened copper is now a relatively well known material which is particularly useful in the fabrication of electrodes for automatic resistance welding machines used, for example, in the manufacture of automobiles. Reference may be had to the patent to Nadkarni et al, U.S. Pat. No. 3,779,714 which discloses a method of dispersion strengthening copper by internal oxidation. U.S. Pat. No. 3,179,515 shows another method of internally oxidizing alloys by surface oxidizing a powdered alloy and then diffusing oxygen into the powder particles to preferentially oxidize a solute metal to solute metal oxide. British Pat. No. 654,962 shows a method of internally oxidizing silver, copper and/or nickel alloys containing solute metals by oxygen diffusion to increase the hardness of the alloy.

Heretofore, bar stock for the production of dispersion stengthened copper electrodes has been produced by a process for canning a dispersion strengthened copper powder, and then extruding through a die to produce a dispersion strengthened rod or bar. (See U.S. Pat. No. 3,884,676 to Nadkarni et al.) Reference may also be had to U.S. Pat. No. 4,045,644 to Shafer et al which shows a process for making a welding electrode from dispersion strengthened metal to improve the grain structure in the electrode tip portion and thereby improve the life of the product.

It has been found that extrusion of a "canned" dispersion strengthened copper powder results in the formation of a densified dispersion strengthened copper characterized by a grain structure in which the grains are substantially in alignment and have a fibrous nature. This is caused by high deformation ratios of the original cross-sectional area of can: cross-sectional area of extrudate used in the process of extrusion, e.g., from about 8:1 to about 200:1. As pointed out in the aforementioned U.S. Pat. No. 4,045,644, an upsetting operation is utilized in the manufacture of resistance welding electrodes to disturb the axial alignment of the fibers and thereby minimize failure of the electrodes by cracking generally in an axial direction longitudinally between the fibers as a result of impact in use.

The present invention provides an improved process for densifying dispersion strengthened metal powder in a metallic sheath or container by staged size reduction in a plurality of stages, some or all of which may be carried out at elevated temperature, e.g., 1000° F., or higher. Staged size reduction alone has been found to be insufficient to assure complete densification of powder and maximum electrode life unless a relationship between the cold worked tensile strength of the outer sheath and the final tensile strength of the substantially fully densified dispersion strengthened metal is observed. "Staged size reduction" as used herein contemplates relatively small size reduction per pass, such reduction being in the range of from about 15% to 35% of the cross-sectional area of the workpiece until at least about 90% of theoretical density, and preferably full density has been achieved. Size reduction may be accomplished by applying compressive force continuously during a given pass, as with rolling, or intermittently during a given pass as with swaging. Usually extrusion is done with very much larger size reduction, i.e., of the order of from about 80% to 99% per pass (See U.S. Pat. No.: 3,884,676). Size reduction of this magnitude with containerized dispersion strengthened powder requires a large investment capital in extrusion apparatus. The present process is less costly from the standpoint of investment and cost of operation. Hence, products can be produced at reduced cost.

Staged size reduction is carried out preferably until full density is achieved. Even during staged size reduction, it has been found if these relative tensile strengths are too disparate, relative deformation in an axial direction between the outer sheath and the inner core is experienced to an extent sufficient to cause cracking of the core. It has been found, therefore, that the cold worked tensile strength of the sheath should not be less than the tensile strength of the fully densified core by more than about 22% to 25% of the ultimate tensile strength of the core. In the case of dispersion strengthened copper, this difference is about 15,000 psi.

The improved process utilizing a swaging machine or rod rolling, involves a lower capital expenditure initially and a lower labor content than the previously practiced extrusion method.

SUMMARY OF THE INVENTION

Briefly stated, the present invention is in a process for forming an elongated member wherein dispersion strengthened, or dispersion strengthenable, metal powder is enclosed in a tube or container which is then sealed. Dispersion strengthening may occur within the tube or container after it is sealed by application of heat. The container is then submitted to a plurality of size reduction stages, for reducing the cross-sectional area by application of compressive force to the container until a powder density of at least about 90% is achieved. Size reduction is within the range of from about 15% to about 35% per pass of the cross-sectional area. Size reduction may be achieved by swaging, or rod rolling, or a combination of these, e.g., swaging followed by rod rolling. After full density is achieved, the product may be handled as a wrought metal and shaped by any of the usual metal shaping processes including drawing, milling, forging (hot or cold), turning, rolling, swaging, or the like. The reductions in cross-sectional area per pass are designed to give initially rapid densification of the powder through the cross-sectional area reduction with minimum lengthening of the tube. Typically, these reductions are in the 20% to 30% range. Intermediate sintering and annealing treatments may be utilized to develop interparticle bonding and stress relief. The initial size reduction and powder consolidation may be done cold or hot although initial cold swaging at a temperature which attains less than 400° F. followed by hot swaging at temperatures usually above 1000° F. is a preferred process. A minimum relationship between the cold worked tensile strength of the sheath and the ultimate tensile strength of the core, measured at room temperature, is maintained whereby the tensile strength of the sheath is no more than about 22% to 25% less than the tensile strength of the core. There does not appear to be an upper limit on the amount by which the cold worked tensile strength of the sheath may exceed the tensile strength of the core.

The swaging of metal powders within a tube is not per se new. Reference may be had to British Pat. No. 981,065 which teaches a method of producing tubes or bars of circular cross sections composed of zirconium or niobium or both. These tubes are used in nuclear reactors as cladding tubes for solid or hollow nuclear fuel elements composed essentially of ceramic nuclear fuel materials, such as uranium dioxide and uranium carbide. Because of the nature of zirconium or niobium or both, these tubes are produced by filling a container formed of zirconium or niobium with zirconium or niobium powder, closing the ends of the tubular member or annular space and subjecting the tubular member thus prepared to a swaging operation at a high temperature (1000° C.) to sinter the mass of powder to a high density and thereafter removing the tubular member by mechanical or chemical means or both.

Reference may also be had to U.S. Pat. No. 4,030,919 to Lea, which teaches forming a bar from a powdered metal by compacting into bar segments, sintering the bar segments and then swaging the sintered bar segment. No outer sheath is utilized in the disclosed process.

Another prior art reference is the Patent to Fischmeister et al, U.S. Pat. No. 4,038,738. This patent teaches a method for producing a bar stock from iron nickel or cobalt base alloy comprising the steps of introducing a powder of the desired alloy into a tubular container together with a reducing agent and an oxygen getter, sealing the container without evacuating it, heating the container and the powder therein and compacting the heated container by progressive forging or swaging and rolling the forged blank.

None of these references contemplates the utilization of a dispersion strengthened metal as the powder or the preservation of a relationship between the ultimate tensile strength of the dispersion strengthened copper core and the cold worked tensile strength of the container.

BRIEF DESCRIPTION OF THE DRAWINGS

In the annexed drawings.

DETAILED DESCRIPTION OF THE INVENTION

As indicated above, the present invention contemplates the use of a dispersion strengthened metal, particularly copper, as the core material which is densified in the course of carrying out the process of the present invention. Other dispersion strengthened metals such as nickel, steel, and the like may also be used in the process of this invention. For most purposes, we prefer to use a dispersion strengthened copper powder having a particle size of less than about 20 mesh (Tyler screen size) preferably from 40 to 800 microns, e.g., 600 microns average, which material has been internally oxidized prior to its entry into the process. Dispersion strengthened copper produced by other methods may also be used and in some cases may contain up to about 4% or 5% aluminum as aluminum oxide. As we have stated above, internal oxidation of the copper alloy (copper-aluminum) may occur during the size reduction operation by elevating the temperature during size reduction to a temperature above about 1000° F., for example, a temperature of from 1200° to 1800° F. for a period of time sufficient to cause reaction between the solute metal (aluminum) and the oxidant (cuprous oxide), provided therein. Although the present invention process will be described in connection with dispersion strengthened copper, it will be understood that the principles and procedures of the present invention are applicable as well to other dispersion strengthened metal powders. Thus, iron, nickel, silver, etc., may be dispersion strengthened with a refractory oxide, such as, aluminum oxide, titanium dioxide, magnesium oxide, silicon dioxide, zirconium oxide, beryllium oxide, and the like.

The advantages of the present invention are realized to the best extent where the amount of solute metal in the form of refractory oxide dispersed within the matrix metal, e.g., copper, iron, cobalt, nickel or alloys thereof, is within the range of from about 0.1% to as high as about 5% by weight. Where the dispersion strengthened metal is internally oxidized dispersion strengthened copper, commercially available examples thereof are identified as "Glidcop" AL-15, AL-20, AL-35, and AL-60. "Glidcop" is a registered trademark of SCM Corporation. These materials are copper based and contain respectively 0.15%, 0.2%, 0.35%, and 0.60% aluminum as aluminum oxide dispersed within the copper matrix. They can be produced by internal oxidation as described in Nadkarni et al. U.S. Pat. No. 3,779,714, or Nadkarni, U.S. Pat. No. 4,315,770. An internally oxidized dispersion strengthened copper composition wherein the aluminum content is 1.0% may be produced and, although it is not presently commercially available, it also can be used in the present process.

The dispersion strengthened metal core of the present invention may, as indicated above, be an alloy which is prepared prior to introduction into sheath as a powder, or, the powder may comprise powdered dispersion strengthened copper and an additional powdered metal. If under the conditions of consolidation and heating, the additional metal forms an alloy with the dispersion strengthened copper, useful products can be produced. Thus, for example, a mixture of 90% GLIDCOP AL-15 or AL-60, for example, with 5% tin powder will yield quite readily a consolidated product of dispersion strengthened copper/tin alloy in a metal sheath, and when the principles of the present invention are applied, cracking during swaging or rolling is avoided.

The principles of the present invention can be applied as well to composites wherein the powdered dispersion strengthened copper is mixed prior to consolidation with a non-alloyable powdered substance such as a hard metal, for example, iron/nickel alloy to form a consolidated composite structure. In these cases, the product is characterized by relatively high mechanical strength, high electrical and thermal conductivity and a low coefficient of thermal expansion. For example, 60 parts of GLIDCOP AL-20 powder screened to −80/+400 mesh is thoroughly mixed with 180 parts of −80/+400 mesh nickel/iron (42%:58% iron, and the powders thoroughly blended. The blended powders may be consolidated by rolling to full density in a sheath provided in accordance with the principles of the present invention.

Thus, the principles of the present invention are applicable to dispersion strengthened copper powders; alloyable compositions of dispersion strengthened copper powder and a metal alloyable therewith by heat; and composite compositions of dispersion strengthened copper powder and a non-alloyable discretely distributed particulate in a composite structure. Such powders are consolidated to substantially full density by rolling or swaging as described herein.

When the dispersion strengthened copper metals of the present invention are substantially completely densified, i.e., 98% to 100% of theoretical density, they should have a tensile strength at room temperature of at least about 50,000 psi. Obviously, in a partially densified state, the dispersion strengthened copper or dispersion strengthenable copper will not have a tensile strength of this magnitude. When fully densified, "Glidcop" AL-15, for example, develops a tensile strength in the range of from 55,000 to 60,000 psi at room temperature. "Glidcop" AL-60, at the other end of the scale, develops a tensile strength in the range from 80,000 to 90,000 psi. "Glidcop" compositions of dispersion strengthened copper containing intermediate amounts of aluminum oxide (calculated as the metal) have tensile strengths which are intermediate to the limits stated above.

The metal container, which ultimately forms the tightly adhering sheath surrounding the dispersion strengthened metal core, is desirably formed of a metal which during the size reduction operation develops a cold worked tensile strength relatively close to that of the ultimate tensile strength of the dispersion strengthened metal core. For most purposes, tensile strength of the sheath under cold working conditions has been found to be a tensile strength no more than about 22% to 25% lower than that of the fully densified core. In the case of dispersion strengthened copper cores this has been found to be no more than about 15,000 psi lower than that of the fully densified core. It has been found for dispersion strengthened copper (DSC) cores that the container is conveniently formed, therefore, of a ferrous metal, such as, steel or stainless steel, or alternatively of nickel, cobalt, copper or copper/nickel alloys. These materials will have a cold worked tensile strength of at least about 40,000 psi. Accordingly, the lower cold worked tensile strength container-forming metals will be used with the dispersion strengthened metal cores which develop ultimate tensile strengths in the lower range, for example, those dispersion strengthened copper materials which contain from 0.1% to 0.2% solute metal as the refractory oxide. On the other hand, with the higher metal oxide contents resulting in ultimate tensile strength at the higher end of the range, for example, from 80,000 to 90,000 psi at room temperature for DSC cores, those metals for forming the container having the higher cold worked tensile strengths, such as, steel, stainless steel, nickel or cobalt or copper/nickel alloys will more favorably be used. Following this schedule, the differential of no more than about 22% to 25% or for DSC about 15,000 psi tensile strength lower than that of the fully densified core can be observed. It should be borne in mind that the tensile strength of the metal container will increase during the swaging operation due to working of the metal.

Figure 2:
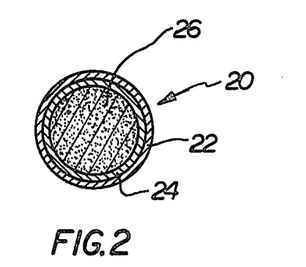
FIG. 2 is a cross-sectional view on an enlarged scale of a composite sheathed densified dispersion strengthened metal core useful in forming wire, e.g. magnetically responsive wire.

Composite sheaths are also contemplated hereby. For example, as shown in FIG. 2, there is provided a wire material 20. It has an outer sheath 22 of copper metal (with the usual trace quantities of impurities) and a contiguous inner sheath 24 of a ferrous, magnetically responsive metal, e.g., iron, steel, or other iron alloy, e.g., iron/nickel. The core 26 is fully densified dispersion strengthened metal, e.g., copper containing uniformly dispersed therein alumina in the range of 0.1% to 0.7% expressed as the equivalent aluminum. Such wire is especially useful for semiconductor lead wire as it has good conductivity and can be handled with magnets. It is formed conveniently by drawing to wire diameter, e.g., 0.030" a fully densified bar having a cross-section such as shown in FIG. 2.

The following schedule shows the important relationship of the relative tensile strengths in accordance with this invention.

| SCHEDULE OF DIFFERENCES IN TENSILE STRENGTHS OF THE SHEATH AND THE CORE | | | |
|---|---|---|---|
| Dispersion Strengthened Copper - % Al | Developed Tensile of Core - psi | AISI 1015 Steel Sheath 80,000 psi max. | Cu Metal Sheath 60,000 psi max. |
| .60 | 90,000 | * = 10,000 | * = 30,000 |
| .35 | 80,000 | — | * = 20,000 |
| .20 | 72,000 | — | * = 12,000 |
| .15 | 65,000 | — | * = 5,000 |

* = difference

From the foregoing schedule, it will be seen that the cold worked tensile strength of the steel sheath (Column 3) is less than 15,000 psi lower than the ultimate tensile strength of the core. This indicates that a steel sheath having a cold worked tensile strength of 80,000 psi is satisfactory for use with the 0.60% aluminum-containing dispersion strengthened copper material. Steel is, however, contra-indicated with the remaining lower aluminum containing DSC materials because the ultimate tensile strength of the core is lower than the cold worked tensile strength of the sheath instead of the opposite relationship.

In the case of the copper metal sheath, for the % Al=0.60 core, the cold worked tensile strength of the sheath is less, but by more than about 15,000 psi. Copper metal is not satisfactory as a sheath material for the 0.60% Al core material. In practice, the core will crack under swaging or rolling. The next example, using the 0.35% Al core is closer, differing by 20,000 psi from the cold worked tensile strength of the copper sheath. However, this material is not satisfactory also due to cracking of the core during size reduction limits per pass stated above. The next two examples, 0.20% and 0.15% Al, respectively, are well within the limit of 15,000 psi and the provision of copper metal sheaths for these lower oxide content dispersion strengthened copper cores is found to be quite satisfactory in swaging or rolling operation and at the size reduction levels hereof.

The tensile strength of useful sheath metals in the cold worked condition can be found in various handbooks, such as, for copper containing sheath materials, the Standards Handbook, Wrought Metal Products, Part II—Alloy Data (1973) Copper Development Association; for stainless steels see Metals Handbook, Volume 1, 8th Edition, page 431 (1961), American Society of Metals, for 1015 cold hard drawn low carbon steel see "Making, Shaping and Treating of Steel," page 911, (1971); for copper/nickel alloy (90:10) after 80% cold working see Metals Handbook, 9th Edition Volume II (1979) Amer. Soc. for Metals, page 374.

The cold worked tensile strength of the sheath may be higher than the full density or ultimate tensile strength of the dispersion strengthened copper core, as illustrated in the following example.

The following Examples I through III show DSC/sheath combinations that are useful in forming resistance welding electrodes. Example IV is directed to a wire product.

EXAMPLE I

A Type 304 Stainless Steel tube with closed ends was filled with "Glidcop" dispersion strengthened copper powder grade AL-60. The tube had a starting outside diameter of 2.0 inches, a wall thickness of 0.065 inch, and was 4 feet long. After 50% cold reduction this tubing had an estimated tensile strength approaching 200,000 psi (See Metals Handbook, 8th Edition, Vol. 1, page 413, C1961 by American Society for Metals), far in excess of the minimum 75,000 psi tube strength necessary for this powder type.

The powder filled tube received a total of eight swaging passes enroute to its final 0.620 inch diameter. Each pass delivered a 25% cross-sectional area reduction. Two of the passes delivered at consecutive intermediate diameters were performed while the rod was heated to 1650° F., while the remaining passes took place at room temperature. At the final diameter the powder was fully densified and of sound structure so as to provide mechanical properties comparable to extruded form.

Slugs from this rod were cut and cold formed into resistance welding electrodes. These electrodes performed very satisfactorily in welding tests and give results indicative of substantially longer electrode life. (See FIG. 1).

EXAMPLE II

Dispersion strengthened copper powder grade AL-60 was filled in a cold drawn tube of AISI 1015 steel. The tube dimensions and processing route were identical to Example I. The cold worked tensile strength of the tube was estimated as 80,000 psi (See The Making, Shaping and Treating of Steel, 1971 by United States Steel Corporation, page 911), again greater than the 75,000 psi tensile strength required by this invention.

Electrodes were again cold formed and tested as in Example I and found also to be very satisfactory in terms of life expectancy.

EXAMPLE III

A 90Cu—10Ni alloy tube with a starting diameter 1.9 inch diameter was filled with dispersion strengthened copper powder grade AL-35 and processed and tested as in Examples I and II. The tensile strength of the tube is 70,000 psi after 80% cold reduction (Metals Handbook, Ninth Edition, Volume 2, 1979 by American Society for Metals, p. 374), again within the 15,000 psi margin of 80,000 psi for AL-35.

The weld test results showed once more the wear of the swage—consolidated electrodes equal to or surpassing the performance of standard extruded product.

EXAMPLE IV

A C-10200 oxygen-free copper tube was filled with DSC powder, "Glidcop" grade AL-15. The tube had a starting diameter of 1.5 inches and a wall thickness of 0.032 inch. After 70% cold reduction, this tube has an estimated tensile strength of 60,000 psi (See "Metals Handbook", Amer. Soc. for Metals, Vol. 1, (1961) page 1009). Because the tensile strength of the fully densified core is 65,000 psi, the tube strength disparity is 5000 psi which is within the limits of this invention.

The powder filled tube received a series of cold and hot swaging cross-sectional area reductions each about 25%. The fully densified rod was then drawn into a 0.014" diameter copper sheathed DSC wire. The tensile properties of the wire were equivalent to or surpassed the properties of AL-20 grade DSC wire produced by hot extrusion and drawing.

EXAMPLE V

A C-10200 oxygen-free copper tube having an outside diameter of 1.50" and a wall thickness of 0.065" and 4 feet in length, was filled with dispersion strengthened copper powder: GlidCop AL-60. The ends of the tube were closed and then it was cold swaged to 1.125" diameter rod in two passes of about equal reductions in the area of cross-section. During this process the density of metal powder in the tube increased from about 50% to about 85% of theoretical full-density. Metallographic examination of a sample of the 1.125" diameter swaged rod showed the rod to be completely free of cracks. The swaged rod was then cut into four pieces of approximately equal length. All four samples were heated in a gas fired furnace for one hour, at 1650° F., in preparation for hot-rolling. Rolling was conducted in a Fenn made 2-High reversing rolling mill (Model No.: 4-104) having a pair of 14" diameter × 14" long grooved rolls. These rolls offered a number of choices for roll pass schedules between the starting size of 1.125" and finish size of 0.625". Table V-1 lists the various groove sizes, shape and cross-sectional area. Each of the four sample rods was rolled in a specific pass schedule. However, three basic rules were adhered to in selecting the roll pass schedules and in carrying out the experiments. These were (i) The stock was rotated by 90° between successive passes, (ii) the stock was fed alternately between grooves having different shapes (e.g., round-→oval→round→diamond, etc.) to allow for some amount of lateral spread, along with reduction in cross-sectional area, and (iii) no more than two passes were taken without reheating the sample at 1650° F., for at least 30 minutes. The test schedules and the results are shown in Table V-2.

TABLE V-1

| Groove No | Dimensions (Nominal) | Shape | Area of Cross-Section in Square Inches |
|---|---|---|---|
| 1 | 1.38" × 0.38" | Oval | 0.84 |
| 2 | 1.18" × 0.38" | Oval | 0.62 |
| 3 | .875" × .437" | Oval | 0.35 |
| 4 | 1.38" × 1.38" | Diamond | 0.86 |
| 5 | 1.5" × 0.25" | Oval | 0.53 |
| 6 | 0.873" × 0.875" | Diamond | 0.44 |
| 7 | 1.00" Dia. | Round | 0.805 |
| 8 | 0.875" Dia. | Round | 0.60 |
| 9 | 0.625" Dia. | Round | 0.29 |

TABLE V-2

| | | Metallographic Examination | |
|---|---|---|---|
| Test No. | Roll Pass Schedule | Sample Taken After Pass No. | Cracking Observed |
| 1 | 1 → 8 → 6 → 9 | 1 | Yes |
| | | 6 | Yes |
| | | 9 | Yes |
| 2 | 1 → 8 → 3 → 9 | 8 | Yes |
| | | 3 | Yes |

TABLE V-2-continued

| Test No. | Roll Pass Schedule | Metallographic Examination | |
|---|---|---|---|
| | | Sample Taken After Pass No. | Cracking Observed |
| | | 9 | Yes |
| 3 | 4 → 2 → 6 → 9 | 2 | Yes |
| | | 6 | Yes |
| | | 9 | Yes |
| 4 | 1 → 8 → 6 → 3 → 9 | 3 | Yes |
| | | 9 | Yes |

As may be noted in the Table V-2, cracking was observed in all samples, some even after the very first pass. The cracks were limited to the core material only and ran generally in a direction perpendicular to the length of the rod.

Since none of the material made here was free of visible cracks, no further testing (such as hardness, density, cold formability measurements) were carried out.

EXAMPLE VI

A 304-L Stainless Steel tube having an outside diameter of 1.50" and a wall thickness of 0.065" and 4 feet in length, was filled with dispersion strengthened copper powder: GlidCop AL-60. The ends of the tube were closed and then it was cold swaged to 1.125" diameter rod in two passes of about equal reductions in the area of cross-section. During this process the density of metal powder in the tube increased from about 50% to 85% of theoretical full-density. Metallographic examination of a sample of the 1.125" diameter swaged rod showed the rod to be completely free of cracks. The swaged rod was then cut into three pieces of approximately equal length.

These rods were heated in a gas fired furnace for one hour, at 1650° F., in preparation for hot-rolling. Rolling was conducted in a Fenn made 2-High reversing rolling mill (Model No.: 4-104) having a pair of 14" diameter×14" long grooved rolls. These rolls offered a number of choices for roll pass schedules between the starting size of 1.125" and finish size of 0.625". Table V-1 lists the various groove sizes, shape and cross-sectional area. Each of these sample rods was rolled in a specific pass schedule. However, three basic rules were adhered to in selecting the roll pass schedules and in carrying out the experiments. These were: (i) The Stock was rotated by 90° between successive passes, (ii) the stock was fed alternately between grooves having different shapes (e.g., round→oval→round→diamond, etc.) to allow for some amount of lateral spread, along with reduction in cross-sectional area, and (iii) no more than two passes were taken without reheating the sample at 1650° F., for at least 30 minutes. The test schedules and the results are shown in Table VI-1.

As may be noted in Table VI-1, all metallographic samples were free of cracks. Further evaluation and testing was carried out to determine the suitability of the finished rod material for making resistance welding electrodes. As shown in Table VI-2, all three samples passed the test.

TABLE VI-1

| Test No. | Roll Pass Schedule | Metallographic Examination | |
|---|---|---|---|
| | | Sample Taken After Pass No. | Cracking Observed |
| 1 | 1 → 8 → 6 → 9 | 1 | None |
| | | 6 | None |
| | | 9 | None |

TABLE VI-1-continued

| Test No. | Roll Pass Schedule | Metallographic Examination | |
|---|---|---|---|
| | | Sample Taken After Pass No. | Cracking Observed |
| 2 | 1 → 8 → 3 → 9 | 8 | None |
| | | 3 | None |
| | | 9 | None |
| 3 | 1 → 8 → 6 → 3 → 9 | 3 | None |
| | | 9 | None |

TABLE VI-2

| Sample from[1] Test No. | Density % Theoretical | Hardness (Rockwell B) | Electrode Formability Test[2] |
|---|---|---|---|
| VI-1 | 99.8% | 81 | Passed |
| VI-2 | 99.5% | 78 | Passed |
| VI-3 | 99.7% | 80 | Passed |

Figure 1:
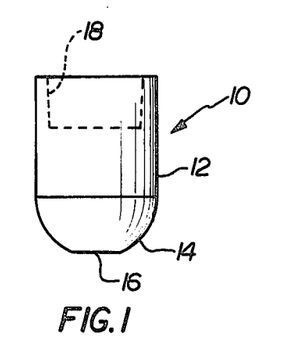
FIG. 1 is a typical resistance welding electrode of the type used in automatic welding machinery. It includes a water hole projecting inwardly from the proximal end and a frusto-hemispherical tip at the distal end flattened to about ¼" diameter.

Footnotes:
[1] All samples are from finished size rod of 0.625" diameter, of respective tests listed in Table VI-1.
[2] Electrode formability was determined by cold forming a resistance welding electrode having dimensions shown in FIG. 1 and inspecting for cracks.

As indicated above, a characterizing feature of the present invention is that dispersion strengthened metal is compacted within the metal container sheath to an extent approaching theoretical density by staged size reduction. Swaging machines capable of handling containers having a diameter of as much as 6 inches are available. Reference may be had to U.S. Pat. No. 3,149,509 and its corresponding British Pat. No. 925,494 for description of one type of swaging machine useful in carrying out the process of the present invention. Other machines are available from the Torrington Company, Machinery Division and the Abbey Etna Machine Company. Rolling machines are well known.

It is desirable to carry out the initial stages of staged size reduction at low temperatures, i.e., without application of heat, because if the container should rupture during impacting, damage to the dispersion strengthened copper by ambient air is minimized, whereas if the staged size reduction were conducted hot to begin with where the core has a large amount of interconnected porosity, rupture at this point would expose the powdered core material to an undue amount of oxidation by ambient air. After the initial size reduction and at the time of the dispersion strengthened metal has reached from 80 to 90% of theoretical density, subsequent staged size reduction is carried out hot, that is, at a temperature in excess of about 1,000° F. and preferably in the range from 1450° to 1650° F. In some cases cold swaging or rolling after a sintering treatment between 1400° and 1800° F. is satisfactory, for example with the lower aluminum oxide grades such as AL-15 and AL-20. With increasing aluminum content, dispersion strengthened copper materials, e.g., AL-35 or AL-60, for example, higher temperatures above 1000° F. are required for swaging and rod rolling to offset the increasing brittleness of these materials and reduce the tendency to core cracking. These temperatures are also sufficient to promote internal oxidation. Where the powder utilized to fill the container has not been internally oxidized prior to its insertion into the container, internal oxidation may be carried out in the container during hot rolling or swaging if desired. However, best results are obtained when the internal oxidation is carried out prior to the can filling operation.

So far as we are now aware, the present invention is best practiced in the following manner. A metal container, preferably steel, closed at one end by any suitable means such as forming a conical point is filled with dispersion strengthened copper powder having a particle size of less than 20 mesh (Tyler), e.g., 600 microns average. The powder used is "Gildcop" AL-35. The metal container is formed of regular carbon steel having a cold worked tensile strength at room temperature of about 80,000 psi. The dispersion strengthened copper has a tensile strength at full density of about 80,000 psi at room temperature. Hence, the cold worked tensile strength of the steel sheath is equal to the ultimate tensile strength of the core and thus provides a satisfactory combination. The container has an OD of 2.0 inches to begin with, a wall thickness of 0.065 inch, and a length of 6 feet. The container is filled with the powdered internally oxidized dispersion strengthened copper and closed at the opposite end, by any suitable means, e.g., a conical point. Sealing or end closure may be accomplished on the swaging machine and need not be a hermetic seal. The container is submitted to from 7–9 passes through the swaging machine with a cross-sectional area reduction of about 25% per pass. In a specific example, 8 passes are used. The first 3 passes are done cold, i.e., without applied heat and the powder brought to about 90% of full density. The next 3 passes are hot at 1650° F. The final two passes are done hot or cold as may be desired. In the present case, size reduction is from 2" diameter to $\frac{5}{8}$" diameter. The dies are changed after each pass to achieve the next cross-sectional area reduction, preferably about 25% per pass. The containers or tubes are conveniently 5 to 6 feet in length, although any length that may be accommodated by the machine may be used.

In the case of "Glidcop" AL-60, the same procedure is followed except that the container may be formed of steel or stainless steel having cold worked tensile strengths of about 80,000 psi for steel and up to 200,000 psi for stainless steel. The dispersion strengthened copper has a final tensile strength of 85,000 to 90,000 psi, and thus maintains the strength relationship described above.

The final densities in each case are in excess of 99% of theoretical, and the resulting rods have an OD of $\frac{5}{8}$" and a tightly adhering steel or stainless steel sheath surrounding a dispersion strengthened copper core.

The $\frac{5}{8}$" diameter rod may then be formed into a welding electrode by tapering or rounding by machine turning one end of the rod leaving, preferably, at one end a small transverse flat surface, and severing the body by any suitable means from the balance of the rod to provide a tip 0.880" long. The portion of the electrode body which has been tapered or rounded to a frusto-conical shape or frusto-hemispherical shape has the characteristic copper color. The balance of the electrode body has a silver metallic color characteristic of steel. A water hole may be machined into the proximal end of the electrode tip. Upsetting of the tip is not necessary to achieve improved tip life. Alternatively, the tip may be formed by cold forging a nose and water hole into a billet cut from a swaged rod produced in accordance herewith.

These electrodes in use have been found to last substantially longer than similar electrodes produced by an extrusion process. This we believe occurs by reason of the fact that swaging avoids to a substantial extent the formation of fibrous structure within the body of the electrode which in use is subject to splitting or cracking in an axial direction. By utilizing the swaging process and controlling the difference in tensile strength as indicated above, we avoid to a large extent the formation of fibers in axial alignment. This results in a product with much lower grain aspect ratio (length to diameter) than extruded product and is better able to withstand compressive forces as experienced in automatic welding machines for a much longer period of time.

Modifications in the process may be made without departing from the invention. For example, the container may contain also an inner core so that when filled with the dispersion strengthened powder metal, the powdered metal fills an annulus around the core member.

The present process may also be used to produce dispersion strengthened copper wire with copper or nickel sheathing for use in electrical incandescent lamps as lead wires. (See U.S. Pat. No. 4,208,603). In this respect, the use of a swaging process is far superior to an extrusion process because the extrusion process is incapable of producing a uniformly coated or clad product. Swaging on the other hand, provides a very thin cladding of uniform thickness. Both clad and unclad products may be made by the process hereof. Decladding can be done after size reduction in accordance herewith by any suitable means, e.g., grinding, leaching, etc.

While the process has been illustrated with dispersion strengthened copper, the advantages of the invention will be achieved with dispersion strengthened metals in general and in particular, as in the case of resistance welding electrodes, where the final product must be able to withstand a primary compressive stress and secondary tensile stress.

The foregoing disclosure has been concerned principally with swaging and rod rolling. The invention hereof is applicable also to sheet rolling. It has been found that the principles of this invention apply to rolling of containerized dispersion strengthened copper compositions across the range of aluminum contents of 0.1% to 5% when the rolled cross section is a rod or bar as well as a sheet where the thickness is much less than the width and the edges unconstrained. With the lower aluminum content dispersion strengthened copper powders, i.e., less than about 0.35% Al, no special procedures in strip rolling appear to be required. However, with the higher aluminum contents, hot rolling is beneficial in reducing the tendency to cracking. The following examples illustrate sheet rolling:

EXAMPLE VII

A copper (C-10200) billet container measuring 8" in length, 3" in width and 0.75" in overall thickness, with 0.065" thick wall on all sides, was filled with dispersion strengthened copper powder; "GlidCop" AL-15 grade, and the ends of the container were closed. It was then cold rolled to a thickness of 0.37", by taking four rolling passes of approximately equal amount of reduction. The density of powder mass in the billet at this point was estimated to be approximately 90% of its theoretical full-density. Hot rolling was performed subsequently, with the aim of attaining theoretical full density in the powder mass and good interparticle bonding.

Two hot rolling passes were taken, each resulting in 20% reduction in area of cross-section. The strip was heated at 1650° F. for 45 minutes, in an atmosphere of nitrogen, for each hot rolling pass. After the two hot rolling passes, the metallographic examination of a sample of the strip showed the material at the core to be free of cracks. The strip was then cold-rolled to 0.050" in thickness, by taking 15% reductions per pass. Tensile test specimens were prepared from this strip material, per ASTM specifications. Two specimens were tested in the as-rolled condition and the other two were tested after annealing at 1800° F. in nitrogen atmosphere for 30 minutes. The results are shown in Table VII-1 below.

TABLE VII-1

| Sample | Metallurgical Condition | Mechanical Properties | | |
|---|---|---|---|---|
| | | Ultimate Tensile Strength P.S.I. | Yield Strength P.S.I. | Percent Elongation |
| Copper Clad GlidCop A1-15 Strip | Cold worked by 64% | 69,000 | 66,000 | 9 |
| 25% Copper 75% GlidCop 0.05" Thick | Annealed at 1800° F. | 51,000 | 42,000 | 25 |

EXAMPLE VIII

A plain carbon steel (AISI 1018) billet container measuring 8" in length, 3" in width and 0.75" in overall thickness, with 0.065" thick wall on all sides, was filled with dispersion strengthened copper powder: GlidCop AL-60 grade, and the ends of the container were closed. It was then cold rolled to a thickness of 0.36", by taking four rolling passes of approximately equal amount of reduction. The density of the powder mass in the billet, at this point, was estimated to be approximately 90% of its theoretical full density. Hot rolling was performed subsequently, with the aim of attaining theoretical full density in the powder mass and good interparticle bonding.

Seven hot rolling passes were taken, each resulting in 20% reduction in the area of cross-section. The strip was heated at 1650° F. for 45 minutes, in an atmosphere of nitrogen, for each hot rolling pass. Metallographic samples were taken after the 2nd, the 5th and the 7th passes. An examination of these samples showed the material at the core to be free of cracks. The thickness of the strip after the 7th hot rolling pass was 0.099". It was then cold rolled to 0.070", in two passes, each having a reduction of 15%. Tensile test sepcimens were prepared from samples of this strip, as per ASTM specifications. These specimens were tensile tested and the results are shown in Table VIII-1 below.

TABLE VIII-1

| Sample | Metallurgical Condition | Mechanical Properties | | |
|---|---|---|---|---|
| | | Ultimate Tensile Strength P.S.I. | Yield Strength P.S.I. | Percent Elongation |
| Steel Clad GlidCop AL-60 Strip 30% Steel 70% GlidCop | Cold Worked by 30% | 86,800 | 79,800 | 4 |

EXAMPLE IX

A copper (C-10200) billet container measuring 8" in length, 3" in width and 0.75" in overall thickness, with 0.065" thick wall on all sides, was filled with dispersion strengthened copper powder: GlidCop AL-60 grade, and the ends of the container were closed. It was then cold rolled to a thickness of 0.37", by taking four rolling passes of approximately equal amount of reduction. The density of powder mass in the billet at this point was estimated to be approximately 90% of its theoretical full density. Hot rolling was performed subsequently, with the aim of attaining theoretical full density in the powder mass and good interparticle bonding.

Two hot rolling passes were taken, each resulting in 20% reduction in area of cross-section. The strip was heated at 1650° F. for 45 minutes, in an atmosphere of nitrogen, for each hot rolling pass. After the two hot rolling passes, metallographic examination of a sample of the strip showed presence of transverse cracks in its cross-section. Attempts were made to cold roll the strip, with taking 15% reduction per pass. However the strip developed cracks during the 3rd pass and hence further rolling was not possible.

The invention may also be modified to yield a deoxidized internally oxidized dispersion strengthened copper rod or bar or tube or sheet by blending the dispersion strengthened copper powder with from 0.01 to 0.1% by weight of boron metal powder, titanium metal powder, or zirconium powder, or the powdered hydrides thereof, prior to compacting and swaging. Hot swaging or sintering is used to cause the boron or titanium to react with free oxygen in the matrix copper metal. Such deoxidized internally oxidized dispersion strengthened copper rod or bar may be drawn into wire useful as lead wire in electric lamps as disclosed in U.S. Ser. No. 344,890 filed Feb. 2, 1982 by Charles I. Whitman as sole inventor and commonly owned with the present application.

Prime uses for the consolidated-from-powder dispersion-strengthened copper stock of this invention include lamp leads, components for X-ray and microwave apparatus, and magnetrons, generally travelling wave tube helices, components of vacuum tubes and hydrogen-cooled electrical generators, semiconductor lead wires and frames, particularly those that need brazing, electric relay blades and contact supports and electric switch gear components in general, components of electrical generators and transformers for resisting mechanical and thermal surges as occur in their short-circuiting, hemostatic surgical scalpels and other components where the dispersion-strenthened copper is bonded to high carbon steel, wire and strip electrical conductors generally, components of vacuum interrupters and circuit breakers, wide sheets or strips as for making shadow mats for TV tubes, and improved resistance welding and MIG (Metal Inert Gas) electrodes and the like, generally all for getting high temperature strength and improved stress-rupture qualities, non-blistering qualities, brazing quality, and improved mechanical properties.

We claim:
1. A process for forming an elongated member of substantially uniform cross-section and comprising a metal sheath surrounding a dispersion-strengthened metal core which comprises the steps of:
    (a) providing a sheath-forming metal container,
    (b) filling said container with dispersion strengthened metal powder having a particle size less than 20 mesh (Tyler Screen Size) and said dispersion strengthened metal containing from about 0.1% to about 5% by weight of a solute metal as a refractory oxide dispersed therein and having a predetermined tensile strength at full density,
    (c) the metal of said container having a tensile strength at room temperature in the cold worked condition no more than about 22% to 25% less than said predetermined tensile strength at full density of said core; and (d) reducing the cross-sectional area of the powder filled container by application of compressive force to said container in a plurality of reduction stages each in the range of from about 15% to about 35% of the cross-sectional area until a density of at least about 90% of theoretical density is achieved.

2. A process as defined in claim 1 in which the compressive force is continuously applied.

3. A process as defined in claim 1 in which the compressive force is applied by rolling.

4. A process as defined in claim 1 in which the compressive force is intermittently applied.

5. A process as defined in claim 1 in which the compressive force is applied by swaging.

6. A process as defined in claim 1 in which the reduction of the cross-sectional area is continued in a staged manner until full density of the powder is achieved.

7. A process for forming an elongated member of substantially uniform cross-section and comprising a metal sheath surrounding a densified dispersion strengthened metal core which comprises the steps of:

(a) providing a sheath-forming metal container;

(b) filling said container with dispersion strengthened metal powder having a particle size less than 20 mesh (Tyler Screen Size) and said dispersion strengthened metal containing from about 0.1% to about 5.0% by weight of a solute metal as a refractory oxide dispersed therein and having a tensile strength at full density of at least about 55,000 psi at room temperature;

(c) the metal of said container having a tensile strength at room temperature in the cold worked condition of not more than about 15,000 psi less than the tensile strength of said densified dispersion strengthened metal at maximum density; and (d) reducing the cross-sectional area of the powder filled container by application of compressive force to said container in a plurality of reduction stages each in the range of from about 15% to about 35% of the cross-sectional area until a density of at least about 90% of theoretical density is achieved.

8. A process as defined in claim 7 wherein the sheath-forming metal container comprises a plurality of contiguous annuli.

9. A process as defined in claim 8 wherein at least one of the annuli is a ferrous annulus and another is a copper annulus.

10. A process as defined in claim 9 wherein the ferruginous annulus is steel.

11. A process as defined in claim 9 wherein the ferruginous annulus is a nickel-iron alloy.

12. A process as defined in claim 9 wherein the ferruginous annulus is an inner annulus and the copper annulus is the exterior annulus.

13. A process as defined in claim 7 in which the compressive force is continuously applied.

14. A process as defined in claim 7 in which the compressive force is applied by rolling.

15. A process as defined in claim 7 in which the compressive force is intermittently applied.

16. A process as defined in claim 7 in which the compressive force is applied by swaging.

17. A process as defined in claim 7 in which the reduction of the cross-sectional area is continued in a staged manner until full density of the powder is achieved.

18. The process of claim 1 wherein the size reduction during the later stages after the core has been densified to the extent of at least about 90% of theoretical density is carried out at an elevated temperature of at least 1000° F.

19. The process of claim 18 wherein the compressive force is applied by swaging.

20. A process as defined in claim 1 wherein the dispersion strengthened metal is copper.

21. A process as defined in claim 7 wherein the dispersion strengthened metal is copper.

22. A process as defined in claim 1 wherein the metal of the container is different from the core matrix metal.

23. A process as defined in claim 1 wherein the metal of the container is a ferrous metal.

24. A process as defined in claim 23 wherein the metal of the container is steel.

25. A process as defined in claim 23 wherein the metal of the container is a stainless steel.

26. A process as defined in claim 1 wherein the metal of the container is nickel.

27. A process as defined in claim 1 wherein the metal of the container is copper.

28. A process as defined in claim 1 wherein the metal of the container is a copper alloy.

29. A process as defined in claim 28 wherein the metal of the container is a copper/nickel alloy.

30. A process as defined in claim 1 wherein the dispersion strengthened metal is internally oxidized dispersion strengthened copper.

31. A process as defined in claim 30 wherein the dispersion strengthened copper is deoxidized.

32. A process as defined in claim 31 wherein the dispersion strengthened copper is deoxidized by the inclusion in the powder of powdered boron.

33. A process as defined in claim 1 wherein the refractory oxide is aluminum oxide.

34. A process as defined in claim 1 wherein the tensile strength of the dispersion strengthened copper at full density is in the range of from about 55,000 psi to about 90,000 psi at room temperature.

35. A process as defined in claim 1 wherein the size reduction is carried out at least in part at a temperature of from 1100° F. to 1850° F.

36. A process as defined in claim 1 wherein the tensile strength of the container metal under cold working conditions is at least about 40,000 psi at room temperature.

37. A process as defined in claim 1 further characterized by the step of shaping a bar in an axial direction.

38. A process as defined in claim 1 wherein the container includes a removable centrally disposed mandrel whereby a sheathed dispersion strengthened copper tube is formed.

39. A bar, tube or strip of substantially uniform cross section comprising a metal sheath in tightly adhering relation with a densified dispersion strengthened copper core, said dispersion strengthened copper core containing from about 0.1% to about 4.0% by weight of a metal as a refractory oxide dispersed therein, said core having a tensile strength of at least about 55,000 pounds at room temperature and said sheath having a tensile strength of at least about 40,000 psi at room temperature.

40. A process as defined in claim 1 wherein the dispersion strengthened copper is deoxidized by the inclusion in the powder of powdered boron, titanium or zirconium, or their hydrides.

41. A resistance welding electrode having a proximal end and a distal end and formed from a swaged bar and comprising (a) a cylindrical portion characterized by a core of internally oxidized dispersion strengthened copper containing from 0.1 to 4.0% aluminum as refractory aluminum oxide dispersed therein, said core having an ultimate tensile strength developed during swaging to full density of at least about 55,000 psi, said cylindrical portion also having a thin metal sheath surrounding and tightly adhering to said core, said sheath having a cold worked tensile strength at room temperature no more than 15,000 psi below the ultimate tensile strength of said core, said cylindrical body also including a recessed water hole in the proximal end thereof, and (b) a tip portion characterized by converging side surfaces terminating in a circular work-contacting tip, the plan of said circular tip being normal to the longitudinal axis of said electrode.

42. A magnetically responsive wire product having an outer sheath of copper, a contiguous inner ferruginous annulus and a core of fully densified internally oxidized dispersion strengthened copper filling said inner annulus, said core containing from 0.1% to 0.7% aluminum as refractory aluminum oxide dispersed therein.

43. A process for forming an elongated member of substantially uniform cross-section and comprising a metal sheath surrounding a dispersion strengthened metal core which comprises the steps of:
(a) providing a sheath-forming metal container,
(b) filling said container with a metal powder comprising dispersion strengthened metal powder and having a particle size less than 20 mesh (Tyler Screen Size) and said dispersion strengthened metal containing from about 0.1% to about 5% by weight of a solute metal as a refractory oxide dispersed therein and having a predetermined tensile strength at full density,
(c) the metal of said container having a tensile strength at room temperature in the cold worked condition no more than about 22% to 25% less than said predetermined tensile strength at full density of said core; and
(d) reducing the cross-sectional area of the powder filled container by application of compressive force to said container in a plurality of reduction stages each in the range of from about 15% to about 35% of the cross-sectional area until a density of at least about 90% of theoretical density is achieved.

* * * * *

UNITED STATES PATENT AND TRADEMARK OFFICE
CERTIFICATE OF CORRECTION

PATENT NO. : 4,478,787

DATED : 23 October 1984

INVENTOR(S) : Anil V. Nadkarni, Prasanna K. Samal, James C. Wang, and James E. Synk It is certified that error appears in the above-identified patent and that said Letters Patent are hereby corrected as shown below:

Title Page under Item (75), "Inventors:" change "Sunk" to ---Synk---.

Signed and Sealed this

Twenty-first Day of May 1985

[SEAL]

Attest:

DONALD J. QUIGG

Attesting Officer     Acting Commissioner of Patents and Trademarks